No. 854,445. PATENTED MAY 21, 1907.
R. T. WEAVER.
APPARATUS FOR THE TREATMENT OF REFRACTORY WATER.
APPLICATION FILED SEPT. 25, 1906.
2 SHEETS—SHEET 1.
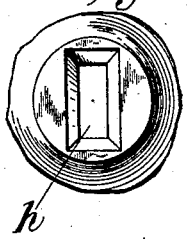
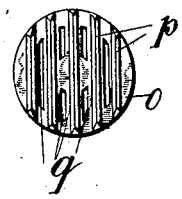
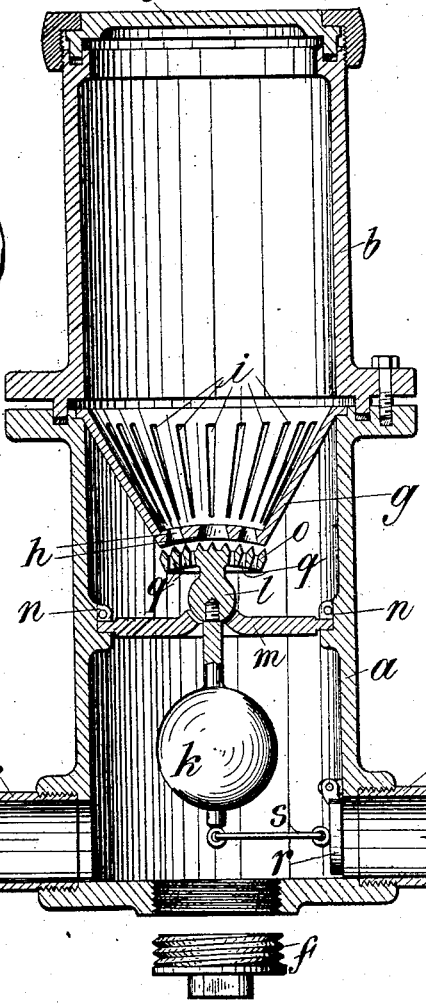
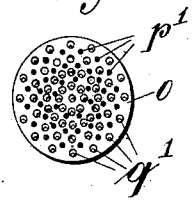
Witnesses
George Schwarz.
Josef Anson.
Inventor
Robert T. Weaver
By his Attorneys
Redding Kiddle & Greeley

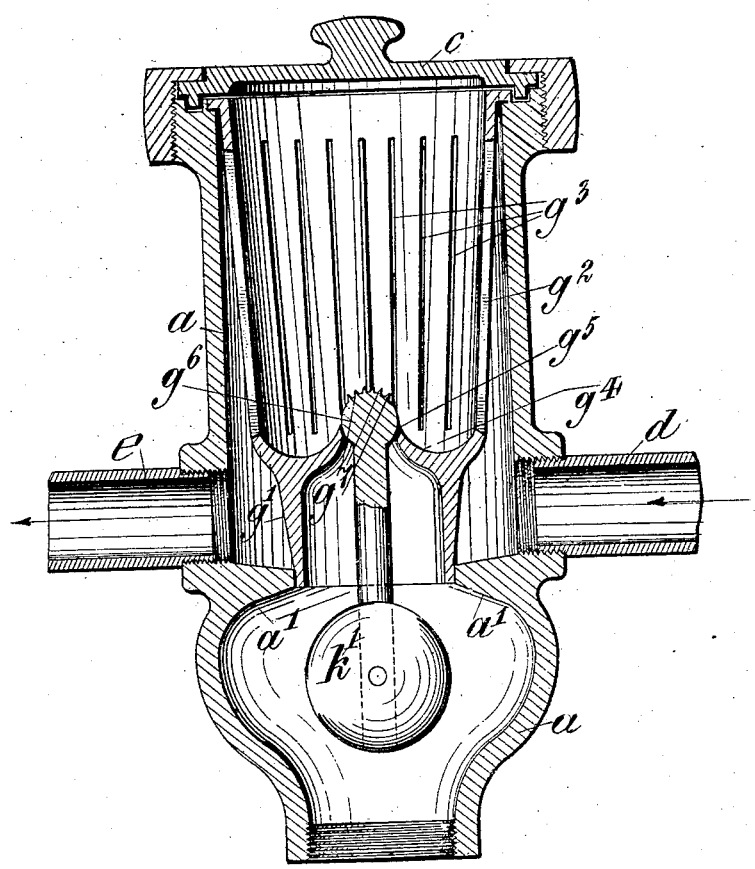

UNITED STATES PATENT OFFICE.

ROBERT T. WEAVER, OF WEEHAWKEN, NEW JERSEY, ASSIGNOR TO JOSEPH SCHNEIBLE, OF WEEHAWKEN, NEW JERSEY.

APPARATUS FOR THE TREATMENT OF REFRACTORY WATER.

No. 854,445.      Specification of Letters Patent.      Patented May 21, 1907.

Application filed September 25, 1906. Serial No. 336,156.

*To all whom it may concern:*

Be it known that I, ROBERT T. WEAVER, a citizen of the United States, residing in Weehawken, in the county of Hudson and State of New Jersey, have invented certain new and useful Improvements in Apparatus for the Treatment of Refractory Water, of which the following is a specification, reference being had to the accompanying drawing, forming a part hereof.

This invention relates to apparatus for adding to refractory water substances which will prevent the concretion of mineral constituents which might otherwise form scale upon the walls of the containing vessel or conductor, as fully set forth in Letters Patent of the United States No. 820,524 granted May 15, 1906, to Joseph Schneible. Apparatus of the character of that disclosed in the said patent operates satisfactorily under most conditions of use, but in some cases, particularly where the volume of water moving toward the boiler is insufficient to operate a turbine, as disclosed in said patent, as in locomotive boilers and other moving boilers, it may be desirable to utilize the movement of the boiler for the purpose of effecting the addition of the desired substance to the water.

Accordingly it is the object of this invention to produce an apparatus of the character shown which shall be caused to operate through the movement of the boiler or of the support upon which the apparatus is mounted. Preferably the apparatus comprises a freely moving body, properly supported, such as a pendulum, for example, the movements of which, under the influence of the oscillations of the boiler or other support for the apparatus, are made to effect the addition of the desired substance to the water on its way to the boiler.

The invention will be more fully explained hereinafter with reference to the accompanying drawings in which, for the purpose of explanation and illustration of its nature, the invention is shown as embodied in different forms.

In the drawings—Figure 1 is a view in vertical central section of one form of the improved apparatus, the movable part or pendulum and a valve connected therewith being shown in elevation. Figs. 2 and 3 are detail views showing different constructions of the bottom of the hopper or container for the talc or other suitable material employed. Figs. 4 and 5 are detail views showing different constructions of the disintegrator which may be employed. Figs. 6 and 7 are detail views of the valve shown in Fig. 1. Fig. 8 is a view similar to Fig. 1, but showing a slightly different embodiment.

In the embodiment of the invention represented in Figs. 1—7 of the drawings the apparatus comprises a suitable vessel $a$ having, if desired, an extension $b$ and a cap $c$ and provided, preferably near its bottom, with an inlet connection $d$ and an outlet connection $e$ for the passage of the water on its way to the boiler and, in the bottom, a cleaning out plug $f$. Seated in the vessel $a$ is a container $g$ to receive and support the talc or other material which is to be added to the water on its way to the boiler in relatively small quantities and in a finely divided condition, the talc as supplied to the container being more or less coarsely divided, like broken stone. The container, as shown in Fig. 1, is, in shape, like an inverted truncated cone and has in its bottom or lower end one or more openings $h$ through which the talc or other material may project somewhat and having also, if desired, slotted openings in its sides to permit a free circulation of water through the material supported by it. Below the funnel or container $g$ is supported a freely movable body $k$, adapted to move or oscillate under the influence of the movements or oscillations of the moving boiler or moving frame upon which the apparatus is mounted. As shown, this freely moving body is a pendulum swung from a suitable bearing $l$ on a cross-bar $m$ preferably mounted to swing in bearings $n$ so as to give greater freedom of movement to the moving body $k$ while supporting it in a central position. The moving body $k$ is made to actuate a device which, as it moves, removes, in a finely divided condition, a small quantity of the talc or other material supported in the container $g$, and adds it or permits it to be added to the water in the vessel $a$ on its way to the boiler or other receptacle or conductor. As shown in the embodiment of the invention illustrated in Fig. 1, this device consists of a grinding head $o$ mounted upon the stem of the pendulum $k$ and provided on its upper surface, in close proximity to the bottom of the container $g$ with suitable ribs $p$, as shown in Fig. 4, or teeth $p'$, as shown in Fig. 5, or otherwise suitably formed to disintegrate the material which projects through the opening $h$ in the bottom of the container $g$. The head $o$ may also be provided with openings such as slots $q$, as shown in Fig. 4, or round holes $q'$, as shown in Fig. 5, to permit the passage of water and of the finely divided particles of the material employed.

It will now be understood that when the locomotive or other carrier for the improved apparatus is in motion, the body $k$ will move or oscillate more or less, under the influence of the movements of the support, and will cause the head $o$ to rub off, in a finely divided condition, small quantities of the talc projecting through the openings in the container $g$ and permit them to be added to the water in the vessel on its way to the boiler or other receptacle or conductor. As talc or whatever material is employed is required to be added to the water in very small quantities only and not in any precise proportion, it will be evident that according to the character of the material used, the size of the openings in the bottom of the container, and the character of the disintegrating or grinding surface of the head $o$, the proper quantity of material to be added to the water in a given time can be provided for.

As provision for adding material to the water when the locomotive or other carrier is standing still may be desired, the movement of the water may be made to effect the separation from the main mass of the proper quantity of finely divided material, as disclosed in said Letters Patent. The particular means which may be employed to advantage in connection with a movable body, as disclosed herein, may comprise, as shown, a valve or flapper $r$ hung over the inlet $d$ and connected by a link $s$ with the movable body $k$. The inflow of the water, particularly when it comes from a pulsating pump, will vibrate the valve or flapper $r$ somewhat and impart sufficient movement to the disintegrator $o$ to cause it to perform its function at least to some extent, although this device might not be sufficient of itself to supply the proper quantity of material for an extended period of time.

In the embodiment of the invention illustrated in Fig. 8, the mode of operation is the same as already described, but the form of the apparatus is slightly different. In this case, the vessel $a$ is provided with a cover $c$, an inlet $d$ and an outlet $e$ as before. Just below the plane of the inlet and outlet pipes the vessel $a$ is provided with a flange $a'$ to receive snugly the imperforate sleeve-like extension $g'$ of the container $g^2$ for the talc or other material employed. The upper portion of the container is slotted, as at $g^3$ to permit the free flow of the water through the material therein and is preferably tapered somewhat, as shown, to permit circulation of the water between the same and the walls of the vessel $a$. The bottom $g^4$ of the container is provided with a seat $q^5$ for the spherical enlargement or head $g^6$ of the pendulum $k'$, and the head may be provided with teeth, as at $g^7$, or otherwise formed to cause a separation of the talc in small quantities and in a finely divided condition, from the main mass, as the pendulum oscillates. Such finely divided material being washed out with the water as it passes through the container from the inlet to the outlet. The provision of a closed bottom $g^4$ and a sleeve-like extension $g'$ for the container prevent the material from settling down in the chamber in which the pendulum oscillates. If the talc or other material employed is in a relatively soft condition, very slight movement of the grinder is necessary and scarcely more is required than that the talc shall be gently disturbed so that the rubbing of one piece against another shall separate fine particles in sufficient quantity.

It will be understood that the particular forms of apparatus shown and described herein are but convenient embodiments of the invention and that details of construction and arrangement may be varied without departing from the spirit of the invention.

I claim as my invention:

1. An apparatus for the treatment of refractory water, comprising a container for the material to be added to the water, a movable body adapted to move under the influence of the movements of the support for the apparatus, and a device operatively connected with the movable body for causing the separation from the mass of small quantities of the material in a finely divided condition.

2. An apparatus for the treatment of refractory water, comprising a vessel having an inlet and an outlet for the water, a container for the material to be added to the water supported in said vessel, a movable body adapted to move under the influence of the movements of the support for the apparatus, and a device operatively connected with the movable body for causing the separation from the mass of small quantities of the material in a finely divided condition and the addition of the same to the water in the vessel.

3. An apparatus for the treatment of refractory water, comprising a vessel having an inlet and an outlet for the water, a container for the material to be added to the water supported in said vessel, a movable body mounted in said vessel and adapted to move under the influence of the movements of the support for the apparatus, and a device operatively connected with the movable body for causing the separation from the mass of small quantities of the material in a finely divided condition and the addition of the same to the water in the vessel.

4. An apparatus for the treatment of refractory water, comprising a vessel having an inlet and an outlet for the water, a container for the material to be added to the water, a pendulum mounted within the vessel and a device operatively connected with the pendulum for causing the separation from the mass of small quantities of the material in a finely divided condition.

5. An apparatus for the treatment of refractory water, comprising a container adapted to receive, in a relatively coarse condition, the material to be added to the water, and having openings through which such material may project, a movable body adapted to move under the influence of the movements of the support for the apparatus, and a grinder operatively connected with the movable body and adapted to act upon the material projecting from the container to separate the material therefrom in small quantities and in a finely divided condition.

6. An apparatus for the treatment of refractory water, comprising a container for the material to be added to the water and having openings through which such material may project, a pendulum adapted to move under the influence of the movements of the support for the apparatus, and a grinder operatively connected with the movable body and adapted to act upon the material projecting from the container to separate the material therefrom in small quantities and in a finely divided condition.

7. An apparatus for the treatment of refractory water, comprising a vessel having an inlet and an outlet for the water, a container for the material, in a relatively coarse condition, to be added to the water mounted in said vessel and having openings through which the material may project, a movable body supported in the vessel and adapted to move under the influence of the movements of the support for the apparatus, and a grinder operatively connected with the movable body and adapted to act upon the material projecting from the container to remove material therefrom in small quantities and in a finely divided condition.

8. An apparatus for the treatment of refractory water, comprising a vessel having an inlet and an outlet for the water, a container for the material, in a relatively coarse condition, to be added to the water mounted in said vessel and having openings through which the material may project, a pendulum supported in the vessel and adapted to move under the influence of the movements of the support for the apparatus, and a grinder operatively connected with the pendulum and adapted to act upon the material projecting from the container to remove material therefrom in small quantities and in a finely divided condition.

9. An apparatus for the treatment of refractory water, comprising a vessel having an inlet and an outlet for the water, a container for the material to be added to the water, a device adapted to cause the separation from the mass of small quantities of the material in a finely divided condition, and a valve or flapper adapted to be vibrated by the incoming water and operatively connected with said device.

10. An apparatus for the treatment of refractory water, comprising a vessel having an inlet and an outlet for the water, a container for the material to be added to the water and mounted in said vessel, a pendulum adapted to move under the influence of the movements of the support for the apparatus also mounted in said vessel, a grinder operatively connected with the pendulum and adapted to separate material from the mass in small quantities and in a finely divided condition, and a valve or flapper adapted to be vibrated by the incoming water and operatively connected with said device.

This specification signed and witnessed this fifteenth day of September, A. D., 1906.

ROBERT T. WEAVER.

Signed in the presence of:
Wм. A. Neal,
Bertram W. Wells.